No. 628,362. Patented July 4, 1899.
J. H. SHEPPARD.
CORN AND COTTON PLANTER.
(Application filed Apr. 25, 1899.)
(No Model.) 2 Sheets—Sheet 2.
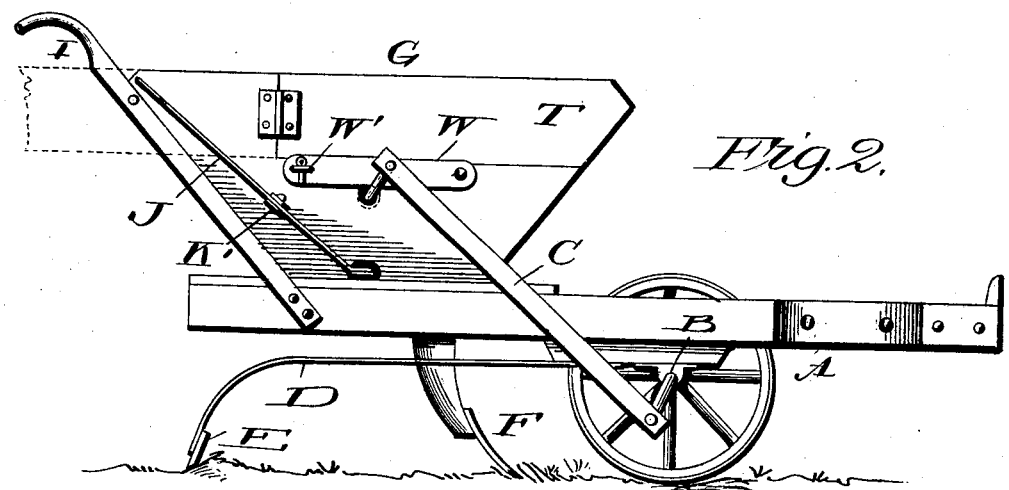
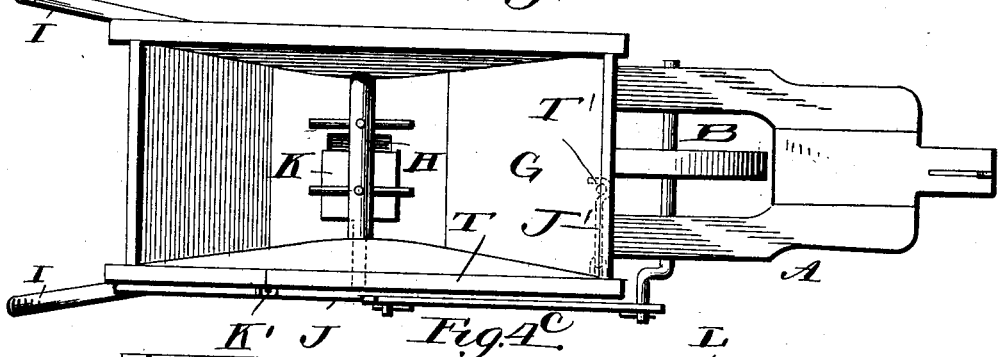
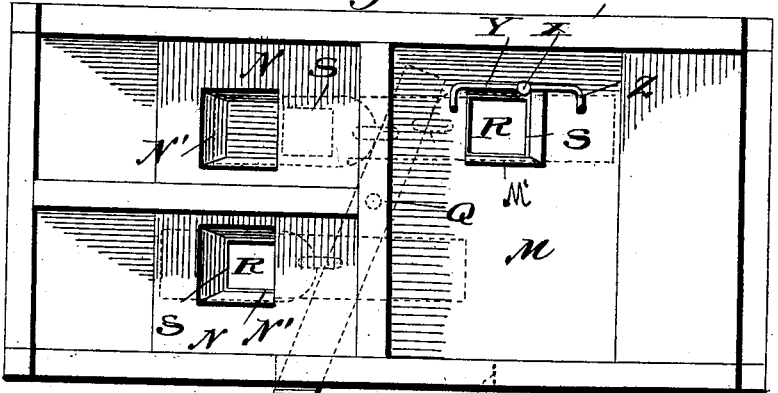

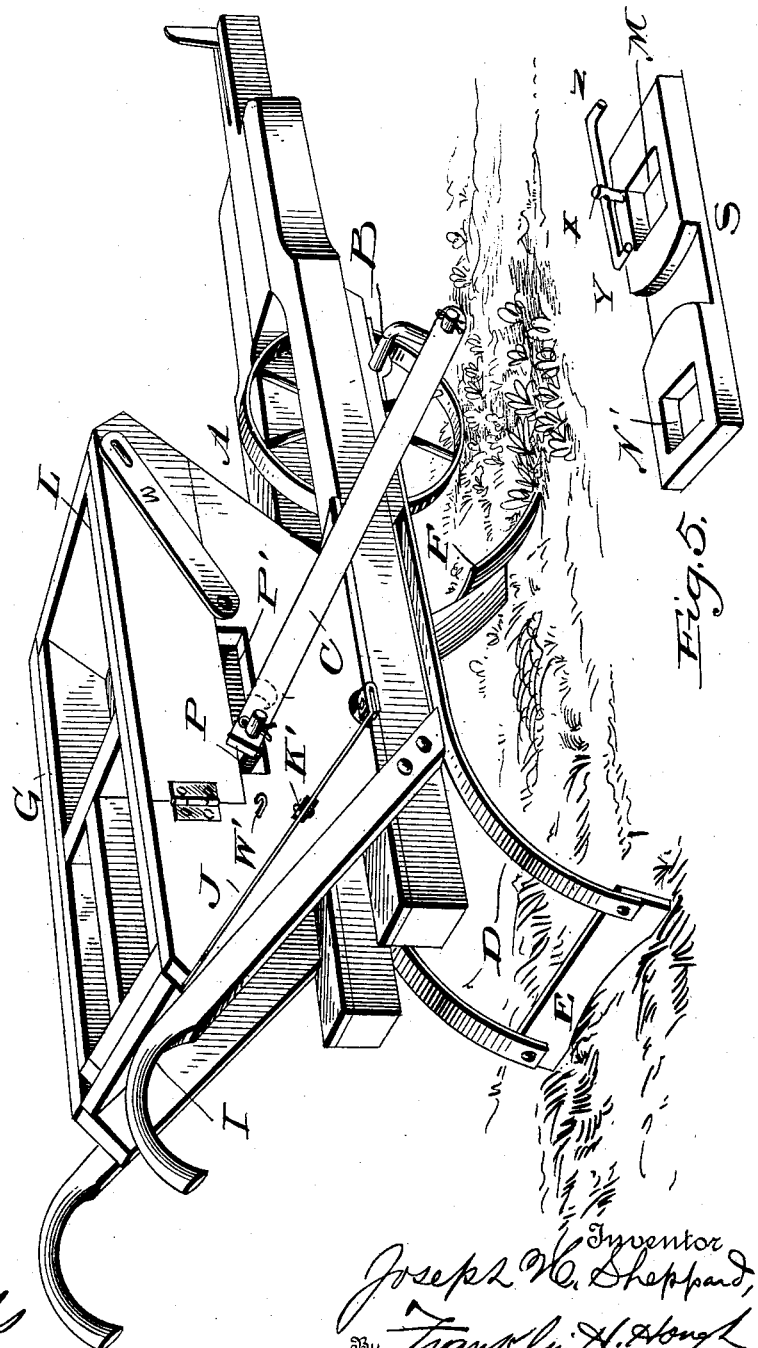

UNITED STATES PATENT OFFICE.

JOSEPH H. SHEPPARD, OF PELAHATCHEE, MISSISSIPPI.

CORN AND COTTON PLANTER.

SPECIFICATION forming part of Letters Patent No. 628,362, dated July 4, 1899.

Application filed April 25, 1899. Serial No. 714,400. (No model.)

*To all whom it may concern:*

Be it known that I, JOSEPH H. SHEPPARD, a citizen of the United States, residing at Pelahatchee, in the county of Rankin and State of Mississippi, have invented certain new and useful Improvements in Corn and Cotton Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in corn-planters or combination corn and cotton planters and fertilizer-distributers, means being provided whereby the machine may be readily adjusted for use as a corn-planter, whereby the kernels of corn may be dropped at uniform intervals and fertilizer deposited adjacent to the hills receiving the kernels, mechanism for allowing the seed to drop being actuated in the usual manner from the driving-shaft of the main operating-wheel.

The invention relates, further, to a corn-planter which may be easily and quickly converted into a cotton-planting machine by removing the seed and fertilizer box and the mechanism for reciprocating the slide-valve which allows the fertilizer and seed to fall at regular intervals, a portion of the side of the hopper being hinged and adapted to swing out to allow of the ready removal of the seed-box and shaft connected thereto and then closed and the space in the side of the hopper closed, thus making a closed wall to prevent the escape of the seed excepting through the apertured lower end of the hopper.

To these ends and to such others as the invention may pertain, the same consists, further, in the novel construction, combination, and adaptation of parts, as will be hereinafter more fully described and then specifically defined in the appended claims.

My invention is clearly illustrated in the accompanying drawings, which, with the letters of reference marked thereon, form part of this application, and in which drawings similar letters of reference indicate like parts throughout the several views, in which—

Figure 1 is a perspective view of my machine adjusted for use as a corn-planter. Fig. 2 is a side elevation showing a hinged side of the hopper in dotted lines swung back. Fig. 3 is a top plan view of the hopper with the hinged side closed and the pivoted strips thrown back over the aperture which is left to allow of the reciprocating movement of the lever which operates the slide-valves, thus forming a closed side to prevent the escape of seed. Fig. 4 is a plan view showing the interior of the receptacle, and Fig. 5 is a detail view showing the guide mechanism which is attached to the sliding valve or plate.

Reference now being had to the details of the drawings by letter, A designates the main frame of the planter, to which is journaled the driving-shaft B, having a crank at one end, to which is connected one end of the pitman C, said shaft having mounted thereon a suitable driving-wheel. On the under side of the planter are the spring-arms D, which extend rearward and are downwardly bent and connected to the scraper E, which scraper is located in the rear of the plow F and provided to cover the seed and fertilizer that have been dropped in the furrow made by the plow. Mounted on the said frame is the hopper G, which at its lower tapered end has a seed-aperture H, which is regulated by a slide-valve K, said slide-valve having an extension projecting through the wall of the hopper and connected to one end of the lever J, which lever is fulcrumed at K' and has its upper end at a convenient location to one of the handles I, secured to the frame, whereby the operator by actuating said lever may make the aperture in the bottom of the hopper through which the seed falls larger or smaller, as may be desired. Located within the hopper is a seed-box L, which is divided into compartments to contain seed or fertilizer, as may be desired. The forward compartment M has an aperture M' therein, through which fertilizer is designed to fall, and the rear compartments N have each a seed-aperture N', through which the seed is allowed to fall by gravity, and directly underneath the bottom of the seedbox is mounted a lever P, which has one end extending out through the elongated aperture P' in the side of the box and is pivoted at Q to the bottom of the box. In the space intervening between the bottom of the said box and the plate or under-bottom portion R are mounted the apertured sliding blocks S, which blocks have linked connection with the said lever P, two of said blocks being connected on the left-hand side of the box, the apertures in which blocks are designed to alternately register with the apertures in the bottom of the seedbox and fertilizer-box on the left-hand side when the lever P is rocked on its pivot. As each apertured block is brought into registration with the aperture in the bottom of the seedbox or fertilizer-box the seed or fertilizer falls by gravity into the aperture, and when the said lever is rocked in the opposite direction the seed or fertilizer is pushed along on the upper face of the under bottom R of the seed-hopper and allowed to fall into an aperture therein and through the bottom of the stationary hopper mounted on the frame of the machine. Connected to the outer end of the lever P is the pitman C, whereby at each revolution of the crank-shaft, on which the main operating-wheel is mounted, said lever is rocked in opposite directions, allowing the fertilizer and seed to drop at uniform intervals.

When it is desired to equip my corn-planter for use as a cotton-planter, the hook J', which is secured to the free end of the hinged portion T of the side of the stationary part of the hopper, is released from the eye T', carried by the hopper, and said hinged portion is swung back, as illustrated in the drawings, which will allow the seedbox to be removed from the stationary hopper, after which the pivoted strip W, which is mounted on the side of the hopper, is swung back, and its apertured end engages over an eye W' on the outside of the hopper, said pivoted strip covering the elongated aperture in which the lever P reciprocates when the machine is adjusted for use as a corn-planter. After said strip is securely held in place on the eye W' the swinging portion T is thrown back to its former position and held in place, thus forming a closed side to the hopper.

In order to guide and hold the valve controlling the aperture in the bottom of the fertilizer-compartment or seedbox, it will be observed that I provide a pin X, which is fastened to the upper end of said valve and has secured to its upper end the bracket-arms Y, which are prevented from rotating on said pin by means of the lugs Z, and the free ends of said bracket-shaped arms are preferably bent at right angles and slide on the upper surface of the bottom of the compartment designed to contain the fertilizer.

Having thus described my invention, what I claim to be new, and desire to secure by Letters Patent, is—

1. A corn and cotton planter, comprising the framework and operating-shaft, a stationary hopper having a valve-regulated aperture therein and a removable seedbox mounted in said hopper, a valve-actuating lever mounted in the lower portion of said box extending through the wall of the hopper, and having connections with the main driving-shaft, as shown and described.

2. A corn and cotton planter comprising the framework and stationary hopper mounted thereon, the valve-regulated aperture therein, a removable seedbox carried in said hopper, slide-valves in said box and a lever for operating the same, the end of said lever extending through the side of the hopper and connections between said lever and the main operating-shaft, whereby as the said shaft rotates, said valves are reciprocated, as shown and described.

3. A corn and cotton planter, comprising in combination with the frame, the stationary hopper thereon, the plow and coverer as described, a stationary hopper with valve-regulated aperture therein, a removable seedbox carried in said hopper, a pivoted valve-actuated lever mounted in the space between the double bottom of said box, the apertured slide-valves connected to said lever on opposite sides of its pivotal portion, and connections between said lever and the main driving-shaft, whereby as said shaft rotates, the slide-valves are alternately brought into registration with the holes in the bottom of the seedbox, as shown and described.

4. In a cotton-planter, the combination with the frame, the driving mechanism, the plow and coverer, the hopper and valve-regulating mechanism at the lower end thereof, a portion of the side of said hopper being hinged to the stationary part of the hopper a hook at its free end, designed to hold said swinging portion closed and the pivoted strip W apertured at one end and designed to be swung over an elongated recess in the side of the hopper and engage over an eye, all as shown and described.

In testimony whereof I affix my signature in presence of two witnesses.

JOSEPH H. SHEPPARD.

Witnesses:
W. C. HARPER,
C. V. BUCHANAN.